SIGNALLING SYSTEM USING TIME-DIVISION-MULTIPLEX

Filed Aug. 21, 1967 2 Sheets-Sheet 1

United States Patent Office 3,516,071
Patented June 2, 1970

3,516,071

SIGNALLING SYSTEM USING TIME-DIVISION-MULTIPLEX

Heinz Roos, Asperg, Germany, assignor to International Standard Electric Corporation, New York, N.Y., a corporation of Delaware Filed Aug. 21, 1967, Ser. No. 661,958
Claims priority, application Germany, Sept. 17, 1966, St 25,888
Int. Cl. H04j *3/00*
U.S. Cl. 340—172.5 7 Claims

ABSTRACT OF THE DISCLOSURE

The invention provides a system for evaluating signals transmitted over each of a plurality of signal channels. Each signal is converted to a higher frequency band so that it may be sampled during time slots individually asscoiated with the channels. By converting the signals to higher frequencies, the sampling rate may be speeded up so that there may be a higher degree of centralization of the evaluation circuits.

The present invention relates to time-division multiplex systems and more particularly to means for evaluating a time-division-multiplex mode of operation wherein AC-signals are transmitted over individual signal channels.

Very often, coded AC-signals are used to control telecommunication systems such as telephone and teleprinting exchange systems and in the data transmission and the telecontrol arts generally. To determine the coded intelligence contents, these signals are conventionally applied at the receiving station to filters having band-pass characteristics which are tuned to the signal frequencies that are used.

In known systems, DC-signal receivers scan the individual signal channels cyclically and store or evaluate the results of each scanning. By use of this technique, a centralization of the reeciving means can be obtained in a simple way. That is, by operating on a time multiple basis, the same receiving means can be made available to a number of signal channels. The scanning period per signal channel can be kept very short. In most cases, the number of signal channels which can be served on such a basis is only limited by the need for keeping the period of a scanning cycle much shorter than the duration of the shortest signal to be considered. Examples of such receivers include central devices for giving loop supervision or toll ticketing fee assessments in telephone exchange systems.

Another situation prevails for AC-signals. In particular, voice-frequency signals are used for speech, key dialling, MFC-signaling, voice-frequency coded teleprinting, data signals, etc. To analyze or to evaluate such signals, filters are frequently required with a bandwidth of about 100 c./s., in order to obtain a sufficient signal resolution. However, since the transient time T of a filter is approximately determined by the relationship:

$$T = \tfrac{1}{2}\Delta f$$

where: $\Delta f$=the filter bandwidth (e.g. about 100 c./s.) the transient time of such filters is about 5 milliseconds. This means that the signal to be evaluated must be applied to the filters for at least 5 milliseconds during signal receiving. Consequently, this relatively long period of time makes a centralization of facilities almost impossible. But this type of system is one wherein a centralization is most desirable because the cost of the filters, code control circuits, speech immunity circuits or interfering signal protective circuits is considerable for AC-signal receivers.

Therefore, methods have been developed for carrying out a centralization without filters. For example, at least one system uses a voice-frequency receiver operating in the time multiplex mode to measure the duration of a halfwave of the frequency to be evaluated. However, the receiver requires a considerable expenditure. In order to obtain a sufficient exactitude, a very high scanning frequency is required in relation to the frequency which is to be evaluated, and only such signals of one or of two frequencies can be evaluated.

Accordingly, an object of the present invention is to provide a method avoiding these disadvantages.

According to one aspect of the invention, the signals on each signal channel are converted into a higher frequency band with a frequency multiplication factor which is equal for all signal channels. During time slots individually assigned to the different signal channels, the multiplied frequency is fed cyclically to a central, frequency-selective evaluating element. The evaluation is carried out in a higher frequency range, and filters with a substantially lower transient time can be used with no loss of resolution. This enables the common use of a centralization of the filter means and of the switching circuits succeeding those filter means for several signal channels.

In its simplest form, this invention provides a frequency multiplier for each signal channel. The signals appearing at the outputs of these frequency multipliers are then scanned cyclically and successively. Thus, the scanning period for a signal channel can be kept low. For example, in case of a frequency multiplication by the factor 1000, filters having a transient time which is 1000-times less may be used with the same resolution. Therefore, the scanning period for a signal channel is less (in the same extent), as compared to a direct connection of the filters to the signal channel in the time multiplex operation. With a cycle of a technically proper duration, the receiving means can successively serve a number of signal channels.

A particularly advantageous embodiment of the invention permits the reception and evaluation of signals with an arbitrary frequency spectrum. This further embodiment is characterized in this that the individual signal channels are scanned cyclically during associated time slots. At a maximum, the duration of the scanning cycle is equal to half the period of the highest frequency to be evaluated. Amplitude values found during a plurality of successive scanning cycles are stored individually in sections of store circuits which are individually associated with the signal channels. The stores are read during individual time slots with a clock frequency which is much higher than the scanning frequency. The analog signals are formed out of the information which is so read, the signals being evaluated with the aid of frequency-selective circuits.

The above mentioned and other features of this invention and the manner of obtaining them will become more apparent, and the invention itself will be best understood by reference to the following description of an embodiment of the invention taken in conjunction with the accompanying drawings, in which.

Figure 1:
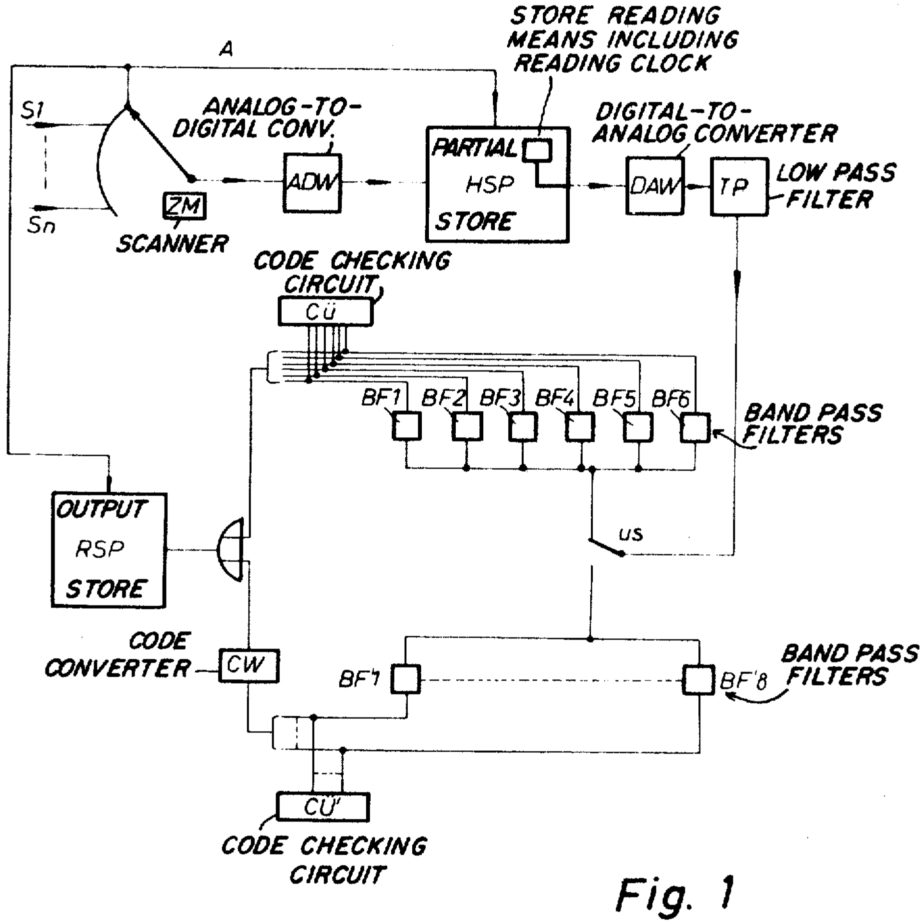
FIG. 1 is a block diagram which shows a plurality of signal channels which are suitable to perform the method according to the invention.

In FIG. 1, the speech signals to be analyzed or frequency-coded signals to be evaluated arrive in the individual signal channels S1 to S$n$. With the aid of the scanner ZM, the signal channels are scanned cyclically and successively. The scanner ZM is shown in FIG. 1 as a rotary selector, but in reality it is preferably an electronic device. Since these devices are sufficiently known, there is no need to explain them here in detail.

At each scanning, the momentary amplitude of the signal on the scanned signal channel is determined. Therefore, the result of each scanning cycle is obtained in the form of an amplitude-modulated pulse in the time slot associated with the scanned signal channel. Corresponding to the teachings of the scanning theorem, the maximum duration of a scanning cycle should be equal to half the period of the maximum frequency to be evaluated.

The pulses furnished by the scanner are fed into an analog-to-digital converter ADW which provides an output in the form of a code signal indicating the amplitude value. For example, the output signal may be a pulse code which is fed into the store circuit HSP. That store circuit HSP comprises a memory row or a partial store circuit for each signal channel S1 to S*n*. Each part of the store circuit is further subdivided into a number of store sections. The information signals arriving on a signal channel are individually stored in succeeding store sections of the partial store associated with the signal channel. The advancing from partial store to partial store is synchronized with the advance of the scanner ZM responsive to signals sent via the signal wire A which extends between the scanner ZM and the stores HSP and RSP.

Figure 2:
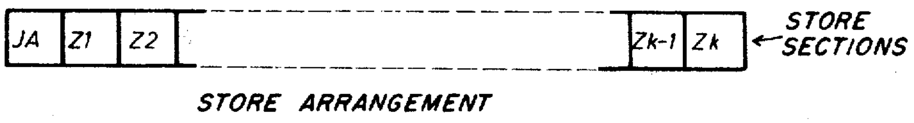
FIG. 2 is a memory row which shows an example for the organization of the store circuit associated with a signal channel.

FIG. 2 shows an example of how a partial store or memory row is organized in circuit HSP. The lode of *k* bits representing the individual amplitude informations are stored in the store sections Z1 and Z*k* of the partial store circuit. Therefore, each bit comprises several storing elements (e.g. magnetic cores). The first store section JA provides an internal address. This address is in the first instance, the store section Z1 in the non-operative condition of Z1. After the first scanning cycle, the internal address Z2 is entered in the store section JA, etc. By using the internal address registered in the store section as an address for the next following store section to be used, the continuous storing of the successively obtained informations for this signal channel is controlled. It is, of course, within the scope of the present invention to use other stores and control methods.

After a number of N cycles (dimensioning of N is explained later) the partial stores are read successively. Thus, the bits of information included in the individual partial store sections Z1 to Z*k* of the circuit HSP are successively fed into a digital-to-analog converter DAW which uses each bit of information to reconstruct the original sample. These reconstructed samples are fed through a low-pass-filter which generates from these samples a continuous analog signal again. However, the clock frequency (*ft*) at which the information bits are read from the store, is a multiple of the scanning frequency *fab*, at which the scanner ZM operates. Therefore, each frequency, included in the original signal, is multiplied in the relation *ft*/*fab*.

Perhaps a numerical example may explain this a little better. Assume that the signal channels S1–S*n* are lines on which signals appear in a 2-out-of-6 frequency code. The highest of the six frequencies used in the code ($f_{max}$) is 2.5 kc./s., the lowest frequency ($f_{min}$) is 1 kc./s. Correspondingly, the longest period (*tg*) lasts for 1 millisecond, the shortest period (*tk*) for 0.4 millisecond. According to the scanning theorem, the duration of a scanning cycle can be Tz=½ *tk*=0.2 millisecond at a maximum. At a technically reasonable scanning period per channel of 10 μsec., 20 channels can be scanned within a single cycle. The cycling period of Tz=0.2 millisecond means a scanning frequency *fab*=5 kc./s.

The time required to read a store section of a partial store is 0.2 μsec., which means that a reading clock frequency *ft* is 5 mc./s. The frequency multiplying factor is then *ft*/*fab*=1000. At the output of the filter TP, a signal appears which may comprise 2.5 mc./s. as maximum frequency and 1 mc./s. as minimum frequency. This signal is fed to six frequency-selective band-pass filters BF1 to BF6, each of which is tuned to 1000-times the value of the associated frequency of the low-frequency code. For a proper separation of the six frequencies in the range of 1 mc./s. to 2.5 mc./s., a bandwidth of 100 kc./s. is quite acceptable. Therefore, assuming that the transient time of each filter corresponds approximately to the reciprocal value of twice its bandwidth, the transient time of the filter is approximately 5 μsec. The signal fed to the band-pass-filters BF1 to BF6 must, therefore, have a minimum duration of 5 μsec.

An advantage of the invention is clearly shown. Filters with a bandwidth of approximately 100 c./s. would be required if the evaluation were made directly in the low-frequency range. These filters would have a transient time of approximately 5 milliseconds. This means that, during a cyclical scanning, at least 5 milliseconds should be provided for each line scanned. In general, for a proper recognition of each signal by means of scanning, the minimum signal length must be at least equal to the duration of scanning cycle. Therefore, at a maximum, two channels could be served by one evaluating device for a signal length of 10 milliseconds, which means that a centralization cannot be performed thereby. As will be demonstrated, the conditions are substantially more favorable when the invention is used.

In order to guarantee that the signals applied to the band-pass-filters BF1 to BF6 will have a minimum duration of 5 μsec., at least N=25 amplitude values must be stored before an evaluation is made. This number (N of the cycles) is calculated as follows:

(1) The duration of a 5 μsec. signal after the frequencies have been increased 1000-times corresponds to a duration of 5 milliseconds of the original signal; (2) For the maximum frequency ($f_{max}$=2.5 kc./s.), a period of *tk*=0.4 millisecond equals 12.5 periods; (3) Since the lines are scanned twice per period of the maximum frequency, 25 scanning cycles occur during the five millisecond period.

For N in general:

$$N=K\times\frac{Tf}{tab}=\frac{ft}{fab}\times Tf\times fab=ft\times Tf$$

where:

K=the frequency multiplication factor,

T*f*=the transient time of one of the high-frequency filters used,

*tab*=the duration of one period of the scanning frequency,

*ft*=the reading clock frequency,

*fab*=the scanning frequency.

After N=25 scanning cycles, the partial stores can be read-out. As a partial store is read in 5 μsec. and the entire store HSP, comprising 20 partial stores, can be read in 100 μsec., a reading cycle of 0.2 millisecond duration is adequate after each 25 scanning cycles.

Control of the reading process is particularly simple. The address of the partial store to be read by the scanner ZM is furnished via the signalling wire A. This address may also be forwarded to an output store RSP which has (like the store HSP) a partial store for each signal channel that is used to receive the information bits which are to be evaluated. Moreover, the store section JA (FIG. 2) may be replaced by an address counter which is common to all partial stores of the memory HSP. If provided, this address counter is advanced one step after each cycle of the scanner ZM. After evaluating the contents of the partial store in the store HSP, the address counter is erased.

Therefore, a complete evaluating process corresponds to the duration of 25 scanning cycles for storing plus one scanning cycle for reading. At a scanning cycle period of 0.2 millisecond, this complies to a duration of 5.2 milliseconds. In the most unfavorable case, each signal can be evaluated at a minimum signal duration of 10 milliseconds. The most unfavorable case occurs when the signal commences at the start of the second scanning cycle. Then only 24 amplitude values are stored. The evaluation shows no result but the required 25 amplitude values can be found and stored during the 25 scanning cycles following the reading cycle.

Preferably, for the above described numerical example, the low-pass-filter TP has a cut-off frequency of 5 mc./s. This filter serves as a demodulator, and it eliminates the harmonics occurring during the scanning.

During the reading cycle, the input of the store is preferably blocked.

As shown in FIG. 1, a code checking circuit CU is connected to the output of the band-pass filters BF1 to BF6. In order to achieve a high level of safety, level checkings may also be provided. Also, an interlock may be made with the aid of a responding delay of the code-check-circuit CU. The advance of the information to the partial store associated with the respective signal channel of the output store RSP is released when a correct code is at hand. Thus, the result of the evaluation can be stored in the output store RSP only once, even when there is a repeated evaluation of an AC-signal.

When using the inventive method in exchange systems, the output store can be identical with the store required for all registers, such as those which receive the dial pulse information. If another scanner is provided in addition to the scanners shown in the FIGS. 1 and 3, it is possible to store alternately MFC-signals or DC-signals (dial switch pulses, teleprinting signals) in a partial storage of the output store RSP. If signals having different codings are received, (e.g. a 2-out-of-6 code or a 2-out-of-8 code), a switch US may be provided to connect the output of the low-pass-filter TP to either the band-pass-filters BF1–BF6, for the 2-out-of-6 code, or the band-pass-filters BF'1–BF'8 for the 2-out-of-8 code. A code-converter CW, converts the output of the filters BF'1–BF'8 into the standard 2-out-of-6 code so that the same coded signals can be fed into the store RSP in the same way, regardless of the code that is received.

The converters ADW and DWA are not mandatory. It is also possible to provide an analog storing, e.g. in storage cells of a capacitor store.

The individual signal channels S1–S*n* may also be scanned by equipment operating responsive to a stored program. The control of the stores HSP and RSP must then be modified correspondingly.

As already mentioned, the embodiment of the invention shown in FIG. 1 can serve as a central receiver for 20 signal channels at a minimum signal duration of 10 milliseconds.

Figure 3:
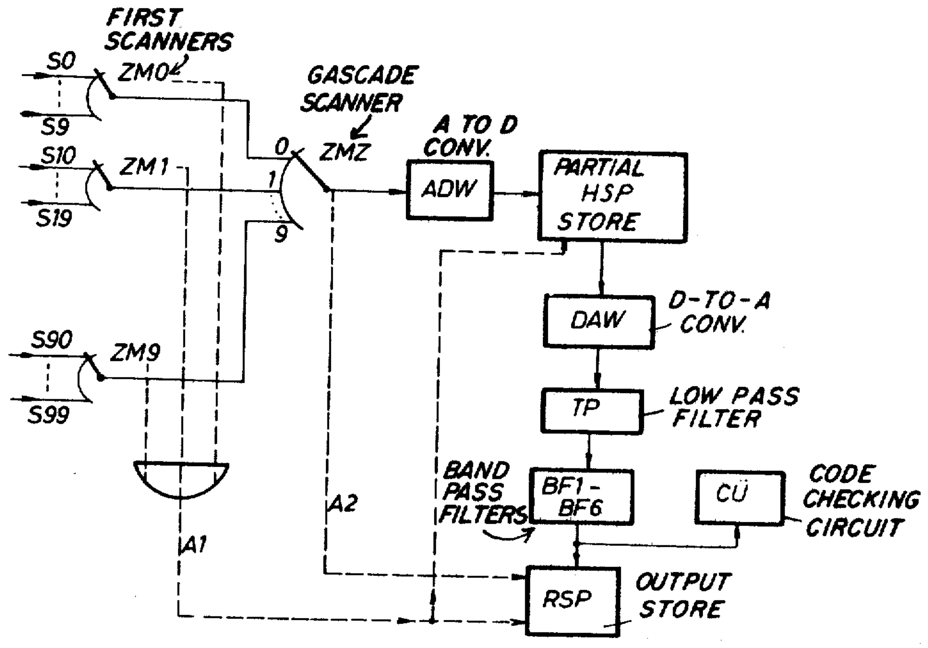
FIG. 3 is a block diagram which shows a second embodiment of the invention represented in FIG. 1.

FIG. 3 shows an arrangement which can be used to increase the degree of centralization, if the signals to be evaluated have a shorter minimum duration.

In FIG. 3, ten groups of signal channels are provided, each group having ten signal channels, designated with SO–S9, S10–S19 . . . S90–S99. A separate scanner ZMO to ZM9 is provided for each group. Each of these separate scanners is, in turn, connected to one of ten inputs of a second cascaded scanner ZMZ. All other devices shown in FIG. 3 correspond to those shown in FIG. 1 which have the same reference symbols. The store HSP comprises ten partial stores and the storage RSP 100 partial stores. The frequency code may be the same. The duration of a scanning cycle of the synchronously rotating scanners ZMO–ZM9 is 0.2 millisecond. The scanning duration per signal channel is 0.02 millisecond. The scanner ZMZ advances by one step every 5.2 milliseconds. Starting from the non-operative position, at first each of the ten signal channels SO–S9 is scanned 25 times while scanner ZMZ is in its O position. The 25 amplitude values which are found for each of the ten channels are written into the individual store sections of the ten partial stores of the store HSP. The store contents are read during the 26th scanning cycle, and the signal is evaluated. Both of the stores HSP and RSP are controlled through the signal wire A1, but only the store RSP is controlled via the signal wire A2.

After 5.2 milliseconds (corresponding to the total duration of the 26 scanning cycles, each of 0.2 millisecond), have passed, the scanner ZMZ switches to the second group scanner which serves the signal channels S10–S19. The 10 partial stores of the memory or store circuit HSP now serve these 10 signal channels. The store RSP is informed through the signal wire A2 that the signals now arriving must be fed into the partial stores of the signal channels S10–S19.

This process is repeated at each group until the scanner ZMZ again reaches the position 0 which occurs after 52 milliseconds.

This means that the memory store circuit HSP is used in the time multiplex operation in an advantageous manner.

For the above indicated numerical values, each of the signals which is to be evaluated must have a minimum duration of approximately 57 milliseconds. This duration results if one adds to the duration of the 50 scanning cycles, required in the case shown in FIG. 1, the nine times 26=234 scanning cycles (each 0.2 millisecond long) inserted between two succeeding settings of the scanner ZMZ to the same group. By reducing the number of groups, suitably shorter signals can be safely evaluated. In case of a shorter scanning period, per signal channel, the number of signal channels per group can be increased. At a scanning duration of 10 $\mu$sec., ten groups, each having 20 channels, can be served as described above.

All numerical values only possess an illustrative character and serve for a better understanding of the invention. The correct dimensioning must be made for each application depending upon the frequency band which is to be evaluated, the signal length, the bandwidth of the filters, the frequency conversion factor, etc.

As already mentioned, the invention can be applied to the frequency analysis of speech signals, when receiving frequency-coded signals in telephone, teleprinting, telecontrol or data technique, etc.

A particular case is given, if in a PCM transmission system the signals or characters to be analyzed are received in the PCM code. In such a case the coded signals can be scanned directly, forwarded to the store HSP, and then evaluated as described above.

While the principles of the invention have been described above in connection with specific apparatus and applications, it is to be understood that this description is made only by way of example and not as a limitation on the scope of the invention.

I claim:

1. A signal system for receiving and evaluating in the time multiplex operation AC-signals transmitted through individual signal channels, said system comprising a plurality of individual signal channels, scanner means for cyclically scanning the individual signal channels during associated recurring time slots for identifying each signal channel, said scanner means having a cycle whose maximum duration is one-half the period of the highest frequency to be evaluated, signal frequency converting means connected to said scanner means for converting signals in each of said signal channels scanned into a higher frequency band, the frequency multiplication factor being equal for all signal channels, and means for cyclically feeding said higher frequencies into a central frequency-selective evaluating element during said time slots individually associated with the signal channels.

2. The system of claim 1 wherein said signal frequency converting means comprises, first memory means for storing amplitude values found during a plurality of successive scanning cycles, said first memory means including stores which are individually associated with the signal channels, means for reading out said stores at individual time slots responsive to a reading clock frequency higher than the scanning frequency after a defined number of scanning cycles at least equal to the product of the transient time of a filter and the reading clock frequency, digital to analog converter means operated responsive to said reading means for forming analog signals out of the information which is read-out, and evaluating means comprising frequency-selective circuits for evaluating said signals.

3. The system of claim 2, characterized in this that analog to digital converter means are provided to convert the signal amplitude values to a code for storage.

4. The invention of claim 2 including low frequency filter means interposed between the signal channels and the frequency-selective circuits for evaluating said signals.

5. The invention of claim 2, characterized in this that stored scanning program means are provided for controlling the scanning of the signal channels.

6. The invention of claim 2, characterized in this that the signal channels are subdıvided into groups, a plurality of first scanning means for scanning associated ones of said groups of signal channels in groups corresponding to their subdivisios, each group being scanned for a predetermined number of cycles, cascaded scanning means for scanning said first scanning means, evaluation circuit means for making an evaluation of said amplitude values, and said evaluation circuit means including output storage means for storing said evaluation in a partial storage of an output store provided for the signal channels of said group.

7. The invention of claim 6 characterized in this that switch means are provided for selectively controlling said evaluating circuitry to accommodate different code signals.

References Cited

UNITED STATES PATENTS 3,311,707 3/1967 Urquhart-Pullen ------ 179—15

RAULFE B. ZACHE, Primary Examiner

U.S. Cl. X.R.

179—15